Nov. 3, 1925.
G. LANE ET AL
1,559,893
STEREOSCOPIC FILM AND METHOD OF PROJECTING SAME
Filed Aug. 3, 1923
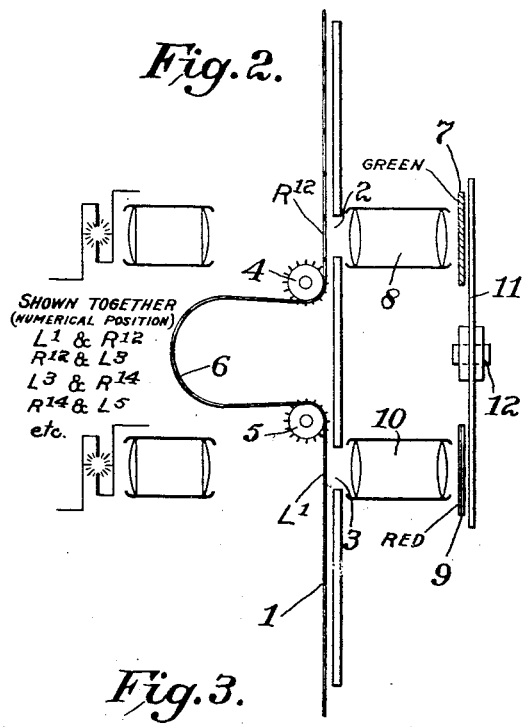
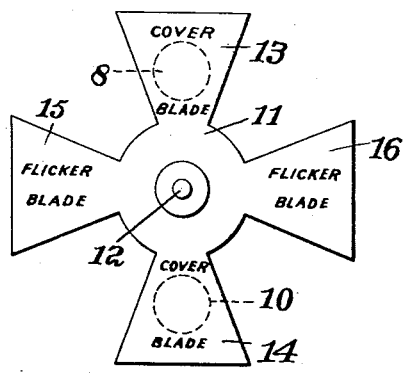
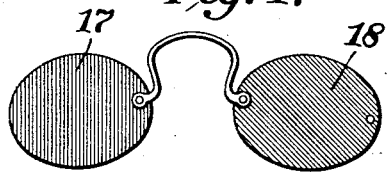
Inventors
George Lane,
John E. Patterson,
by Spear, Middleton, Donaldson & Hall
Attys.

Patented Nov. 3, 1925.

1,559,893

UNITED STATES PATENT OFFICE.

GEORGE LANE AND JOHN E. PATTERSON, OF POUGHKEEPSIE, NEW YORK.

STEREOSCOPIC FILM AND METHOD OF PROJECTING SAME.

Application filed August 3, 1923. Serial No. 655,500.

*To all whom it may concern:*

Be it known that we, GEORGE LANE and JOHN E. PATTERSON, citizens of the United States, and residents of Poughkeepsie, in the county of Dutchess and State of New York, have invented certain new and useful Improvements in Stereoscopic Films and Methods of Projecting Same, of which the following is a specification.

Our present invention relates to a method of producing stereoscopic effects in moving pictures.

The principal object of our invention is the provision of a film for use in a projector whereby the desired effect will be produced.

A further and principal object of our invention is the arrangement of the stereoscopic pairs of pictures which are to be projected on the film strip in such a definite relation to each other that the greatest efficiency may be secured from a projector without duplication of parts, film strips, or the like.

This invention is an improvement upon our Patent No. 1,514,543 patented November 4, 1924, and is designed to overcome certain inefficiencies found in commercial practice of the said invention.

In the above mentioned invention we found it desirable to utilize a single film strip of ordinary width upon which stereoscopic pairs of pictures in photographical sequence were arranged in consecutive order. We then projected two adjacent pictures upon a screen simultaneously. The film strip was then advanced one picture and one of the previously projected pictures was then paired with a new picture and the two simultaneously projected. The composite picture thus produced on the screen was separated into right and left hand pictures which were to be viewed by the observer's right and left eye respectively by placing in front of the lenses red and green filters through which the pictures were projected. The observer was then provided with eye pieces of the respective colors of the lens filters with the result that the eye looking through the red filter picked out from the composite picture on the screen only that view projected through the red lens filter. In a like manner the picture projected through the green filter was visible only to the eye covered by the green eye piece. Thus each eye of the observer viewed only its respective picture of the stereoscopic pair with the result that a stereoscopic effect was produced.

In carrying out commercially the above invention, we found that in some circumstances it was not desirable to have a stereoscopic pair, or pictures taken in photographic sequence, adjacent each other on the film strip. Various circumstances may contribute to make such a requirement undesirable, but it is not thought necessary to enumerate these details at this time.

This invention, therefore, contemplates, in view of the above, a single width film strip having photographically sequential stereoscopic pairs of pictures separated by intervening pictures.

The invention further contemplates a method of producing stereoscopic effects in moving pictures by projecting two photographically sequential pictures simultaneously, said pictures being spaced apart in their relation to each other on the film strip. One of these pictures is then projected with the next photographically sequential picture simultaneously.

We have illustrated in the accompanying drawing, diagrammatically, one embodiment of our invention, although obviously this may be carried out in various ways as circumstances will best determine, and it is understood that we are not to be limited to the specific embodiment shown.

In these drawings:—

Figure 1 is a diagrammatic view of the film used in this invention.

Fig. 2 is a diagrammatic view of the projector and associated parts.

Fig. 3 is a side elevation of the shutter.

Fig. 4 is a diagrammatic view of the viewing device.

Referring now more particularly to the drawings, we have illustrated a single width film strip having thereon a series of individual pictures forming stereoscopic pairs, that is pictures of objects taken from right and left hand positions in photographic sequence. The diagrammatic pictures on the film 1 are lettered left and right to indicate the relative position from which the picture was taken. The numbers on the left side of the film strip indicate the photographic sequence of the pictures. That is, picture 2 was taken directly after picture 1, 3 after 2, 4 after 3, etc. The figures to the right of the strip 1 designate the numerical position of the picture on the film, thus pictures having the numerical positions 1 and 12 are photographically sequential.

Any even number of spaces, or pictures, may intervene between photographically sequential pictures and the exact interval will be determined by the projector used. For instance, we may make use of a projector having two film gates 2 and 3, each having its corresponding feed sprocket 4 and 5 of double size in connection with double diameter feed cams running at half speed. These instrumentalities have not been illustrated for the reason that they are standard, it simply being desired to feed the film past the film gates alternately two spaces at a time instead of one, as is usual, the still period being double that in the ordinary machine. The total length of film running through the machine for a given time will, therefore, be the same as with the ordinary projector.

If the loop 6 between the sprockets 4 and 5 be equal to the amount of interval between stereoscopic pairs of pictures, photographically sequential pictures will be projected simultaneously through gates 2 and 3. The feed sprockets 4 and 5 are so geared to the drive mechanism that they operate intermittently, that is, the sprocket 4 will advance the film two frames while the sprocket 5 is stationary. Likewise the sprocket 5 will advance the film two frames while the sprocket 4 is stationary. It will thus be seen that if the interval 6 is equal to an even number of pictures, the pictures projected through the gate 2 will miss the gate 3, and likewise those pictures shown through the gate 3 will have skipped the gate 2. Thus the total amount of film passing through the machine in a given time will equal that of the ordinary projector now in use.

Stationary color screens are to be provided through which each picture is projected, for instance, a red color screen 7 may be placed in front of the lens assembly 8 for the upper picture, and a green screen 9 before the lens assembly 10 for the lower picture.

A shutter 11 rotating on a shaft 12 in the usual manner, may be provided, but where a single shutter is desired to be used in connection with both pictures being projected, it will preferably be of the design shown. The shutter in this case may be provided with cover blades 13 and 14 and flicker blades 15 and 16 with spaces intervening between these blades. Thus cover blades 13 and 14 will intercept the picture being projected from lenses 8 and 10 respectively, while the film is being advanced two frames at one of the gates. Upon one-eighth rotation of the shutter the pictures will again pass to the screen through the space between blades. Flicker blades 15 and 16 operate in the usual manner to make the cessation of the picture on the screen less apparent. Upon further rotation of the shutter the pictures again pass between blades, and again cover as the blades 13 and 14 complete a one-half revolution about the shaft 12.

It may be found desirable to provide individual shutters for each beam projected, in which case the shutters will be of the ordinary construction synchronized to operate in unison.

It is to be understood that each observer will be provided with colored glasses having a red lens 17 and a green lens 18, for the purpose above described.

The operation of the device is as follows: The projector having been threaded with the film, and the mechanism started, it will be apparent that if it has been found that a ten-picture interval will efficiently separate the two film gates, the pictures occupying the numerical positions 1 and 12 will be projected simultaneously through the gates 2 and 3 respectively. By referring to the diagrammatic picture of the film strip it will be seen that pictures 1 and 12 form a stereoscopic pair in that they were taken photographically sequentially. Upon an advance of the film two frames by the sprocket 5, at which time the sprocket 4 is stationary, the picture in numerical position 3 will be brought opposite the film gate 3, thus numerical picture 12 and numerical picture 3 are projected simultaneously. Upon referring to the numbers to the left of the strip it will be seen that pictures 3 and 12 are photographically sequential and, therefore, form a stereoscopic pair. The next advance takes place at the sprocket 4, sprocket 5 remaining stationary. At this time numerical picture 14 is brought opposite the film gate 2 and this picture is shown with numerical picture 3. By referring to the numbers to the left of the film strip, it will be found that these are photographically sequential and, therefore, form a stereoscopic pair. In this way each picture is shown simultaneously with a different picture, both pictures forming stereoscopic pairs.

In the claims where we have mentioned the pictures as being separated, we refer to the separation caused by pictures intervening between others, and not to the usual line of demarkation, or minute space between ordinary pictures. This separation may be a distance equal to one frame, or many frames.

While we have shown, for the sake of ease of illustration, the two pictures as being projected from points one above the other, yet obviously they may be projected from points in a horizontal line.

By the words "stereoscopic pair of pictures" we mean two pictures of the same object taken from horizontally separated view points, and next each other in sequence of exposure in the taking camera.

Having thus described our invention, what we claim is:—

1. A method of producing a stereoscopic effect in moving pictures which include the step of projecting through color screens each individual picture of a series of pairs of successively photographed, horizontally differentiated stereoscopic pictures from a film strip simultaneously on the same screen area, first with its preceding photographically sequential neighbor and then with its succeeding photographically sequential neighbor, the individual pictures comprising a stereoscopic pair having other pictures therebetween, and viewing said pictures projected on the screen through color screens.

2. A method of producing stereoscopic effects in moving pictures which includes the step of projecting two successively photographed, horizontally differentiated stereoscopic pictures from a film strip simultaneously on the same screen area, the individual pictures comprising the stereoscopic pair having other pictures therebetween, and then projecting one of said pictures simultaneously with a picture of a succeeding stereoscopic pair, and differentiating right and left hand pictures to the right and left eyes of the observer so that the right eye sees only the right hand picture, and vice versa.

3. A method of producing stereoscopic effects in moving pictures which includes the step of projecting through color filters from a single width film strip each individual picture of a series of pairs of successively photographed, horizontally differentiated stereoscopic pictures, first with its preceding photographically sequential neighbor and then with its succeeding photographically sequential neighbor, the individual pictures comprising a stereoscopic pair having other pictures therebetween.

4. A method of producing a stereoscopic effect in moving pictures which includes the step of projecting each individual picture of a series of pairs of horizontally differentiated photographically sequential stereoscopic pictures from a film strip, simultaneously through color filters, first with its preceding photographically sequential neighbor and then with its succeeding photographically sequential neighbor, the individual pictures comprising the stereoscopic pair having other pictures therebetween and viewing the projected image through color filters.

In testimony whereof, we affix our signatures.

GEORGE LANE.
JOHN E. PATTERSON.